Dec. 8, 1925.

W. J. ENGLE 1,564,333

AGRICULTURAL IMPLEMENT

Filed Feb. 5, 1923

Inventor
W. J. Engle

By

Attorney

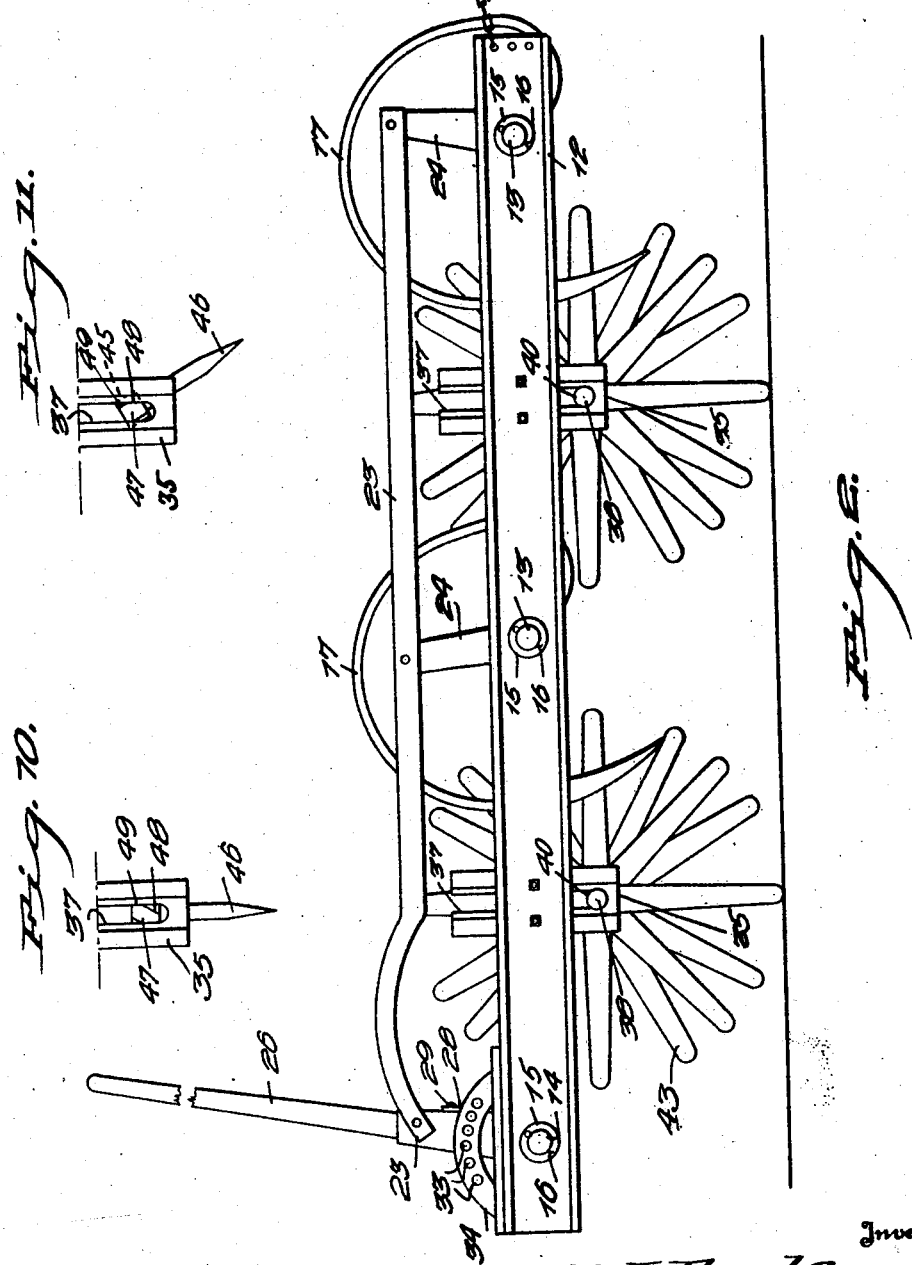

Dec. 8, 1925.                W. J. ENGLE                1,564,333
                      AGRICULTURAL IMPLEMENT
                       Filed Feb. 5, 1923           3 Sheets-Sheet 3
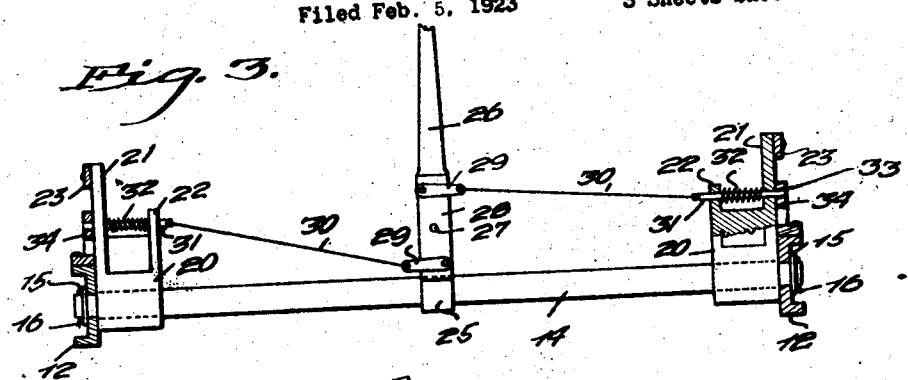
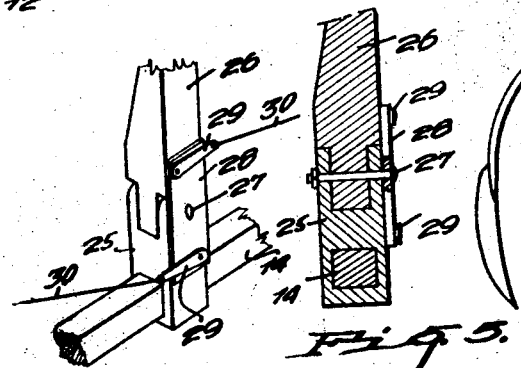
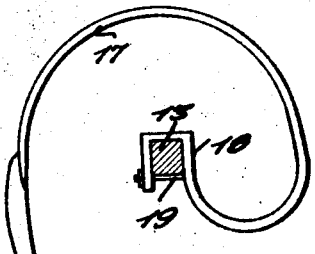
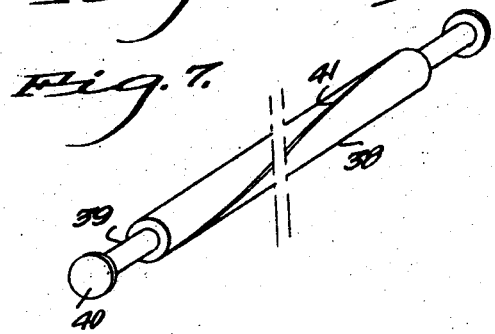
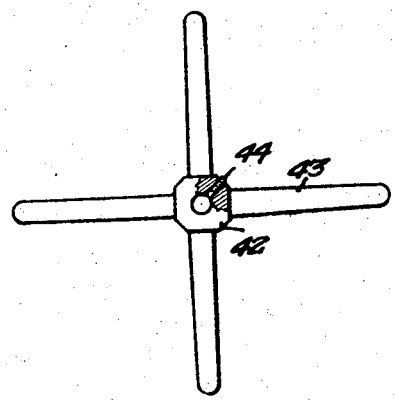
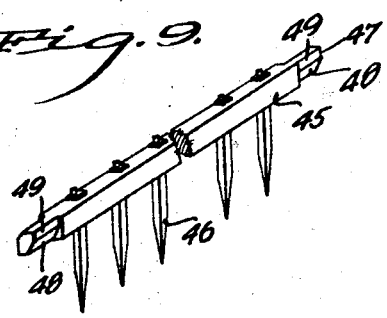
Inventor
W. J. Engle
By
Attorney Patented Dec. 8, 1925.

1,564,333

UNITED STATES PATENT OFFICE.

WASHINGTON J. ENGLE, OF URBANA, ILLINOIS.

AGRICULTURAL IMPLEMENT.

Application filed February 5, 1923. Serial No. 617,123.

*To all whom it may concern:*

Be it known that I, WASHINGTON J. EN-GLE, a citizen of the United States, residing at Urbana, R. #3, in the State of Illinois, have invented certain new and useful Improvements in Agricultural Implements, of which the following is a specification.

The present invention relates to harrows, and while peculiarly useful as a part of the combination tool or machine illustrated in my co-pending application, Serial No. 617,-122, filed simultaneously herewith, there are certain features that may be otherwise employed and made the subject-matter of the present application.

In the accompanying drawings:—

Figure 2 is a side elevation of the same,

Figure 3 is a cross sectional view through the rear end, showing the adjustment controlling means.

Figure 4 is a detail perspective view of the mounting for the operating lever,

Figure 5 is a sectional view therethrough,

Figure 6 is a detail cross sectional view illustrating the mounting of one of the spring harrow teeth, Figure 7 is a perspective view of one of the cleaner carrying shafts.

Figure 8 is a view of one of the cleaner spiders,

Figure 9 is a detail perspective view of one of the spike tooth bars,

Figures 10 and 11 are detail views illustrating the different positions the said bars may assume.

Figure 1:
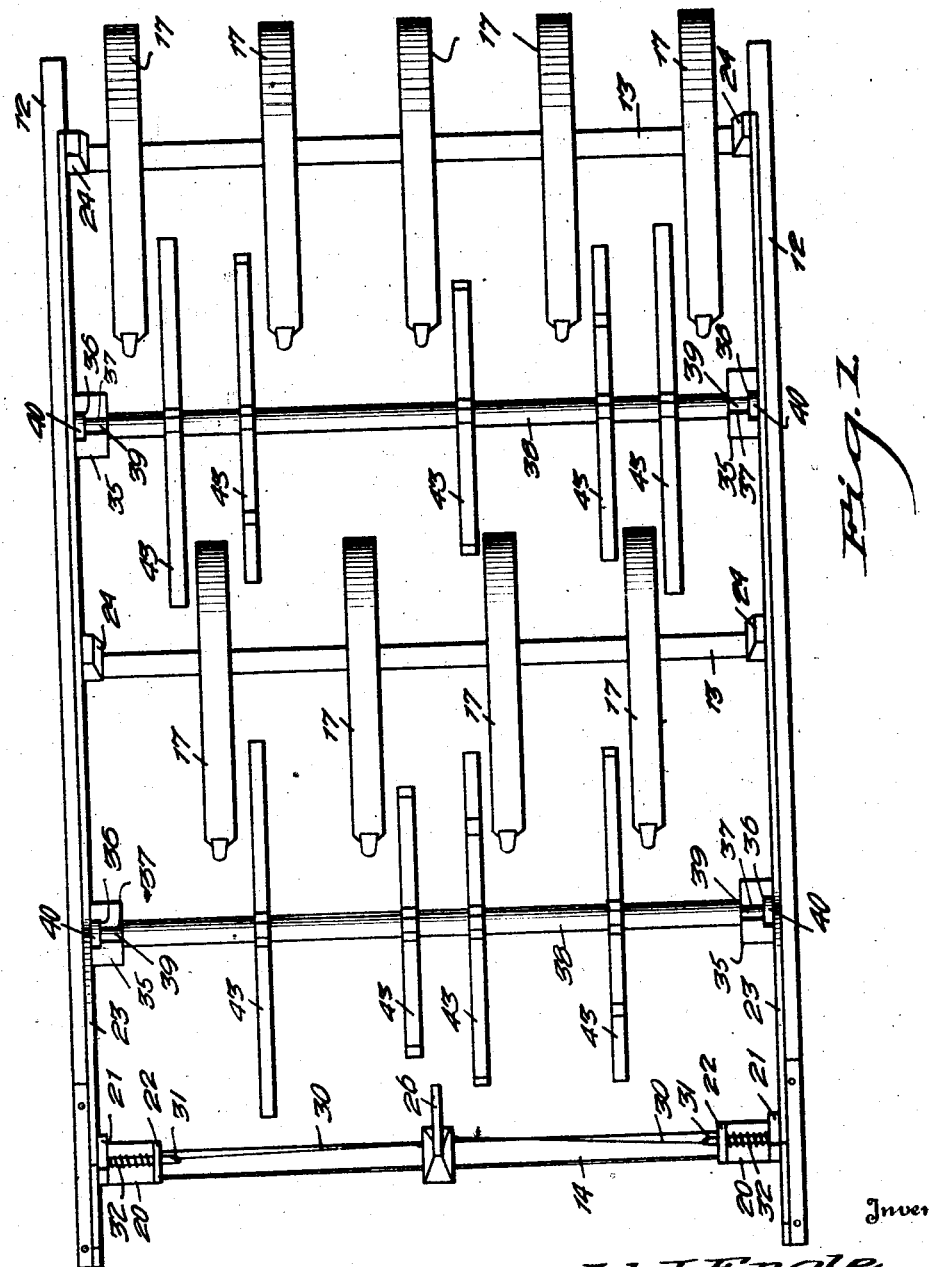
Figure 1 is a plan view of the tool or implement.

In the structure disclosed, a frame is employed, comprising side bars or members 12, preferably of channel iron, which are connected by rock shafts 13 and 14 journaled therein, said rock shafts projecting through the bars 12, and having washers 15 on their projecting ends. Cotter pins 16, or other fasteners, serve to prevent end play of the shafts. The shafts between their ends are square in cross section, and the shafts 13 carry earth-agitating elements, in the form of spring teeth 17. These teeth have yoked inner ends 18 that embrace the bars 13 and are secured in place by bolts 19, as illustrated in Figure 6.

The rearmost rock shaft designated 14 constitutes an actuating shaft, and has mounted on its ends, just inside the side bars 12, crank heads 20 terminating in upstanding arms 21 and ears 22. The arms 21 are connected by links 23 with arms 24 mounted on the ends of the rock shafts 13. Secured to the central portion of the rock shaft 14 is a boxing 25, on which is pivotally mounted a hand lever 26, the pivot mounting, as shown at 27, being disposed transversely of the shaft 14, and thus permitting the lever to swing in the plane of the shaft, while being held fixedly against movement transversely of the said shaft. This lever is provided with a plate 28 carrying links 29 located respectively above and below the pivot or fulcrum 27, and these links are connected by rods or cables 30 with bolts 31 slidably mounted in the ears and crank arms 21, the bolts having springs 32 thereon that urge them outwardly and into any one of a series of sockets 33 formed in holding arcs 34, the arcs 34 fastened to the side bars 12 alongside the heads 20. With this arrangement, it will be evident that by swinging the lever 26 in one direction longitudinally of its supporting shaft 14, the bolts 31 can be withdrawn from engagement with the arcs 34, and then by swinging the lever forwardly or backwardly, the rock shafts 13 will be turned to elevate or depress the earth-agitating elements. Moreover these elements may be secured in different relations by engaging the bolts in the different openings 33 of the holding arcs.

Secured to the inner sides of the side bars 12 are keepers 35 which are in the form of U-shaped plates, forming guideways 36, as shown in Figure 1, said plates having vertical slots 37 that are open at their upper ends, but terminate short of the lower ends of the keepers. These keepers interchangeably receive members that may be employed in co-operation with the spring harrow teeth. Thus in Figures 1, 2, 7 and 8, said members are for the purpose of cleaning the teeth. To this end shafts 38 are employed, having gudgeons 39 that engage in the slots 37, and said gudgeons have terminal heads 40 that pass down the guideways and serve to lock the shafts in position, while permitting their free rotation. The shafts have spiral keyways 41 and adjustably mounted on said shafts are spiders comprising hubs 42 with radial cleaning fingers 43. Set screws 44, threaded through the hubs, engage in the keyways 41. As illustrated in Figures 1 and 2, when the spiders are on the shafts, and spaced along the same, their fingers will be in different relations and they are so arranged that they will engage the ground and also operate alongside the harrow teeth 17. Consequently as the apparatus is propelled along the ground these cleaners will rotate by reason of their engagement with the ground, and the fingers will operate alongside the teeth to detach therefrom the accumulations of grass, roots and the like trash.

Instead of the cleaners, spike harrow teeth may be supported in the keepers. As illustrated in Figures 9, 10 and 11 bars 45 are employed for carrying the spike teeth 46. These bars terminate in reduced portions 47 having their opposite faces provided with angular portions 48 and 49, one portion of the face on one side being parallel to the diagonally opposite portion on the other side. By removing the rotatable cleaners, as described, the bars may be dropped into position and depending on the way in which they are placed, as indicated in Figures 10 and 11 the teeth may either be held vertical or at an angle to the perpendicular.

The structure obviously can be employed in a variety of ways, and has a wide range of use, not only because of the adjustability of the parts, but because of their interchangeability.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In an agricultural tool, the combination with a frame having side members, of rock shaft journaled therein and carrying earth agitating elements, an end rock shaft journaled in the side members and having crank heads at its ends, link connections between said crank heads and the other rock shafts, a lever pivoted on the end rock shaft to swing longitudinally of said shaft, holding arcs secured to the side members alongside the crank heads, securing bolts in said crank heads adapted to engage the holding arcs, and connections between the lever and bolts.

2. In an agricultural tool, the combination with a frame, including side bars, of rock shafts journaled on the side bars and carrying earth agitating implements, and rotary members journaled on the side members and having cleaning fingers that operate alongside the earth agitating implements.

3. In an agricultural tool, the combination with a frame, including side bars, of rock shafts journaled on the side bars and carrying earth agitating teeth, rotary shafts journaled on the side members, and cleaning fingers radiating from the shafts and adapted to successively engage the ground and thereby turn the shafts, said fingers operating alongside the teeth.

4. In an agricultural tool, the combination with a frame, including side bars, of rock shafts journaled on the side bars and carrying earth agitating teeth, rotary shafts journaled on the side members and having spiral keyways, and cleaning fingers having hubs surrounding the shafts and having keys in the keyways, said fingers being adapted to successively engage the ground and thereby turn the shafts, said fingers operating alongside the teeth.

5. In an agricultural tool, the combination with a frame, including side members, of rock shafts journaled on the side members and carrying earth agitating implements, keepers carried by said side members, and rotatable cleaning fingers for the implements having gudgeons that detachably engage in the keepers.

In testimony whereof, I affix my signature.

WASHINGTON J. ENGLE.